(12) United States Patent
Matsumoto et al.

(10) Patent No.: US 10,141,819 B2
(45) Date of Patent: Nov. 27, 2018

(54) ACTUATOR DEVICE AND DEVICE FOR CONTROLLING OPENING/CLOSING BODY OF VEHICLE

(71) Applicant: AISIN SEIKI KABUSHIKI KAISHA, Kariya-shi (JP)

(72) Inventors: Keisuke Matsumoto, Anjo (JP); Seiichi Sumiya, Takahama (JP); Tomohiro Negishi, Kariya (JP); Ryoichi Fukumoto, Nagoya (JP); Eisuke Umemura, Kasugai (JP)

(73) Assignee: AISIN SEIKI KABUSHIKI KAISHA, Kariya-shi (JP)

( * ) Notice: Subject to any disclaimer, the term of this patent is extended or adjusted under 35 U.S.C. 154(b) by 539 days.

(21) Appl. No.: 14/896,579

(22) PCT Filed: May 28, 2014

(86) PCT No.: PCT/JP2014/064168
§ 371 (c)(1),
(2) Date: Dec. 7, 2015

(87) PCT Pub. No.: WO2015/005013
PCT Pub. Date: Jan. 15, 2015

(65) Prior Publication Data
US 2016/0126812 A1    May 5, 2016

(30) Foreign Application Priority Data

Jul. 10, 2013  (JP) .................................. 2013-144882

(51) Int. Cl.
*H02K 11/40* (2016.01)
*F16D 27/112* (2006.01)
(Continued)

(52) U.S. Cl.
CPC ............ *H02K 11/40* (2016.01); *F16D 27/112* (2013.01); *F16D 27/14* (2013.01); *H02K 5/10* (2013.01);
(Continued)

(58) Field of Classification Search
CPC .......... H02K 11/40; H02K 11/21; H02K 5/10; H02K 5/225; H02K 7/1085; F16D 27/112; F16D 27/14
See application file for complete search history.

(56) References Cited

U.S. PATENT DOCUMENTS 5,462,496 A * 10/1995 Dick ...................... B60K 17/35
                                                              180/248
5,698,914 A * 12/1997 Shiga ..................... F02N 11/00
                                                              310/154.12

(Continued)

FOREIGN PATENT DOCUMENTS

JP         63-160063 U     10/1988
JP         2002-174263 A    6/2002
(Continued)

OTHER PUBLICATIONS

International Search Report dated Jul. 22, 2014 for PCT/JP14/64168 Filed May 28, 2014.
(Continued)

*Primary Examiner* — Mohamad Musleh
(74) *Attorney, Agent, or Firm* — Oblon, McClelland, Maier & Neustadt, L.L.P.

(57) ABSTRACT

An actuator apparatus includes a motor, an electromagnetic clutch, and an accommodation member accommodating the electromagnetic clutch, the electromagnetic clutch including an armature supported by a drive member rotated by motor drive and being adapted to rotate integrally with the drive member, a rotor being rotatable relative to the armature and
(Continued)

being adapted to rotate integral with an output member, an electromagnet being capable of connecting the armature and the rotor to each other in accordance with an electromagnetic attractive force generated by electrification in such a manner that torque of the motor is transmittable, the actuator apparatus including a conductive member integrally provided at the accommodation member and being connected to a conductive portion of the electromagnetic clutch in such a manner that the conductive member forms a ground circuit that can connect the conductive portion with ground.

10 Claims, 9 Drawing Sheets

(51) Int. Cl.
    *F16D 27/14*     (2006.01)
    *H02K 11/21*     (2016.01)
    *H02K 5/10*     (2006.01)
    *H02K 5/22*     (2006.01)
    *H02K 7/108*     (2006.01)

(52) U.S. Cl.
    CPC ........... *H02K 5/225* (2013.01); *H02K 7/1085* (2013.01); *H02K 11/21* (2016.01)

(56) References Cited

U.S. PATENT DOCUMENTS

| | | | | |
|---|---|---|---|---|
| 6,161,671 | A * | 12/2000 | Sakamoto | ............ F16D 27/112 |
| | | | | 192/82 T |
| 2006/0175917 | A1* | 8/2006 | Nanbu | ................... H02K 3/522 |
| | | | | 310/71 |
| 2011/0001388 | A1* | 1/2011 | Fujii | ...................... H02K 3/522 |
| | | | | 310/257 |

FOREIGN PATENT DOCUMENTS

| | | |
|---|---|---|
| JP | 2007-46626 A | 2/2007 |
| JP | 2008-2634 A | 1/2008 |
| JP | 2008-95704 A | 4/2008 |

OTHER PUBLICATIONS

International Preliminary Report on Patentability and Written Opinion dated Jan. 12, 2016 in PCT/JP2014/064168 filed May 28, 2014 (submitting English translation only).

* cited by examiner

ACTUATOR DEVICE AND DEVICE FOR CONTROLLING OPENING/CLOSING BODY OF VEHICLE

TECHNICAL FIELD

This invention relates to an actuator apparatus and a control apparatus for an opening and closing body for a vehicle.

BACKGROUND ART

A known actuator apparatus of which a drive source is a motor may include an electromagnetic clutch which can selectively connect and disconnect a transmission path of a motor torque. For example, according to an actuator apparatus described in Patent reference 1, an electromagnetic clutch apparatus includes an armature and a rotor. The armature is supported by a drive member rotated by a motor drive and rotates integrally with the drive member, and the armature is provided to be movable in an axial direction. The rotor is arranged coaxially with the armature to be rotatable relative to the armature and rotates integrally with an output member. By making the armature and the rotor to be in pressure contact with each other in accordance with an electromagnetic attractive force generated by an electromagnet thereof, the two rotating bodies (the armature and the rotor) can be connected to each other in such a manner that torque of a motor is transmittable.

In addition, the actuator apparatus includes an accommodation member accommodating a speed reduction mechanism and the electromagnetic clutch. According to the known art, a worm wheel (a wheel gear) constituting the speed reduction mechanism serves as the drive member supporting the armature in such a manner that the armature is movable in the axial direction while rotating integrally, as described above.

DOCUMENT OF PRIOR ART

Patent Document

Patent document 1: JP2008-95704A

OVERVIEW OF INVENTION

Problem to be Solved by Invention

However, normally, the drive member is formed using resin so that the drive member is not influenced by the electromagnetic attractive force. Further, also the accommodation member is often formed using resin because of a high degree of freedom in forming. Therefore, there is a problem that static electricity is charged at the electromagnetic clutch because the drive member is in sliding contact with the accommodation member. Then, it is possible that the static electricity charged at the electromagnetic clutch is discharged to electronic components which are arranged with an air gap provided. Consequently, room for improvement still remains in this aspect.

The purpose of this invention is to provide an actuator apparatus and a control apparatus for an opening and closing body for a vehicle, which can prevent charging of static electricity which occurs at an electromagnetic clutch.

Means for Solving Problem

An actuator apparatus of an example of this invention achieving the above-mentioned purpose includes a motor functioning as a drive source, an electromagnetic clutch being capable of selectively connecting and disconnecting a torque transmission path of the motor, an accommodation member accommodating the electromagnetic clutch. The electromagnetic clutch includes an armature supported by a drive member rotated by motor drive, the armature being adapted to rotate integrally with the drive member and to be movable in an axial direction, a rotor arranged coaxially with the armature to be rotatable relative to the armature, the rotor being adapted to rotate integral with an output member, an electromagnet causing the armature and the rotor to be in pressure contact with each other in accordance with an electromagnetic attractive force generated by electrification and being capable of connecting the armature and the rotor to each other in such a manner that torque of the motor is transmittable. The actuator apparatus includes a conductive member integrally provided at the accommodation member and being connected to a conductive portion of the electromagnetic clutch in such a manner that the conductive member forms a ground circuit that can contact the conductive portion with ground.

Another embodiment of this invention provides a control apparatus for an opening and closing body for a vehicle, which includes the actuator apparatus of the above-described embodiment.

MODE FOR CARRYING OUT THE INVENTION

Figure 1:
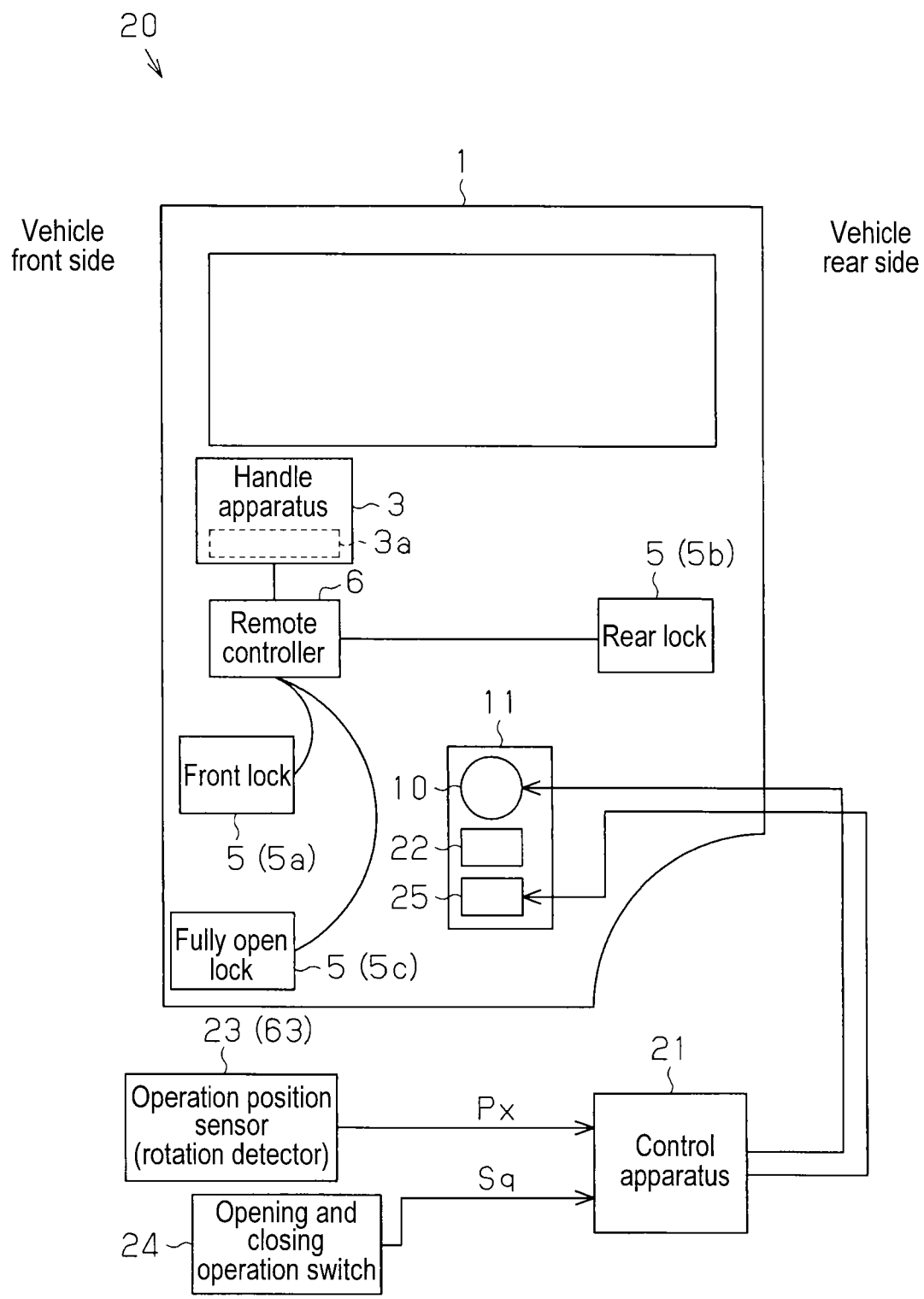
FIG. 1 Block diagram illustrating a schematic configuration of a power slide door apparatus FIG. 2 Plain view of an actuator apparatus FIG. 3 Side view of the actuator apparatus FIG. 4 Cross-sectional view of the actuator apparatus (cross-sectional view taken along line IV-IV of FIG. 3)

An embodiment of an actuator apparatus applied to a power slide door apparatus will be described with reference to the drawings. As illustrated in FIG. 1, a slide door 1 serving as an opening and closing body provided at a vehicle is configured to open or close an opening portion (not shown) provided at a body side surface of the vehicle by moving in a vehicle front and rear directions. Specifically, the slide door 1 comes to be in a closed state, in which the opening portion of the body is closed, by moving towards a vehicle front side (the left side in FIG. 1). In addition, the slide door 1 comes to be in an open state, in which entry and exit is possible via the opening portion, by moving towards a vehicle rear side (the right side in FIG. 1). A handle apparatus 3 operated to open and close the slide door 1 is provided at the slide door 1.

Specifically, the slide door 1 is provided with a front lock 5*a* and a rear lock 5*b* which are for restraining the slide door 1 at a fully closed position (a fully closed lock). In addition, the slide door 1 is provided with a fully open lock 5*c* for restraining the slide door 1 at a fully open position. Each lock mechanisms (latch mechanisms) 5 is mechanically connected to the handle apparatus 3 via a transmission member, including, wire extending from a remote controller 6.

That is, on the basis of operation of an operation portion (an outer handle and an inner handle) 3*a* provided at an exterior surface and an interior surface of the slide door 1, an operation input relative to the handle apparatus 3 is transmitted to each of the lock mechanisms 5. Then, in accordance with an operating force thereof, the restraint on the slide door 1 is released, thereby allowing the slide door 1 in the fully closed position to move in an opening direction or allowing the slide door 1 in the fully open position to move in a closing direction.

In addition, a power slide door apparatus 20 is provided at the vehicle. The power slide door apparatus 20 includes an actuator apparatus 11 of which a drive source is a motor 10, and the power slide door apparatus 20 can cause the slide door 1 to perform an opening and closing operation.

Specifically, in this embodiment, the motor 10 of the actuator apparatus 11 rotates in accordance with a driving electric power supplied by a control apparatus 21. That is, an operation of the actuator apparatus 11 is controlled via the supply of the driving electric power which is conducted by the control apparatus 21. In addition, the actuator apparatus 11 is provided with a speed reduction mechanism 22 which decelerates rotation of the motor 10 and outputs the rotation. The power slide door apparatus 20 of this embodiment can cause the slide door 1 to perform the opening and closing operation by transmitting the rotation of the motor 10 which has been decelerated by the speed reduction mechanism 22 to a drive portion (not shown) of the slide door 1.

More specifically, in this embodiment, an operation position sensor 23 detecting an operation position (open and closed position) Px of the slide door 1 is connected to the control apparatus 21. In addition, an operation request signal Sq, which requests the opening and closing operation of the slide door 1 by motor drive, is inputted to the control apparatus 21 as the above-described handle apparatus 3, a portable device (a remote controlling key) or an opening and closing operation switch 24 provided inside a vehicle cabin is operated. On the basis of the input of the operation request signal Sq and the operation position Px of the slide door 1, the control apparatus 21 is configured to control the operation of the actuator apparatus 11 to cause the slide door 1 to perform or stop the opening and closing operation.

In addition, the actuator apparatus 11 of this embodiment is provided with an electromagnetic clutch 25 which can selectively connect and disconnect a torque transmission path of the motor 10 serving as the drive source. In this embodiment, also an operation of the electromagnetic clutch 25 is controlled by the control apparatus 21. For example, the control apparatus 21 controls so that the electromagnetic clutch 25 comes to be in an open state in a case where the slide door 1 is opened and closed manually. Accordingly, this embodiment is configured in such a manner that the slide door 1 operates smoothly even in a case of a manual operation because the torque transmission path of the motor 10 is disconnected.

Figure 2:
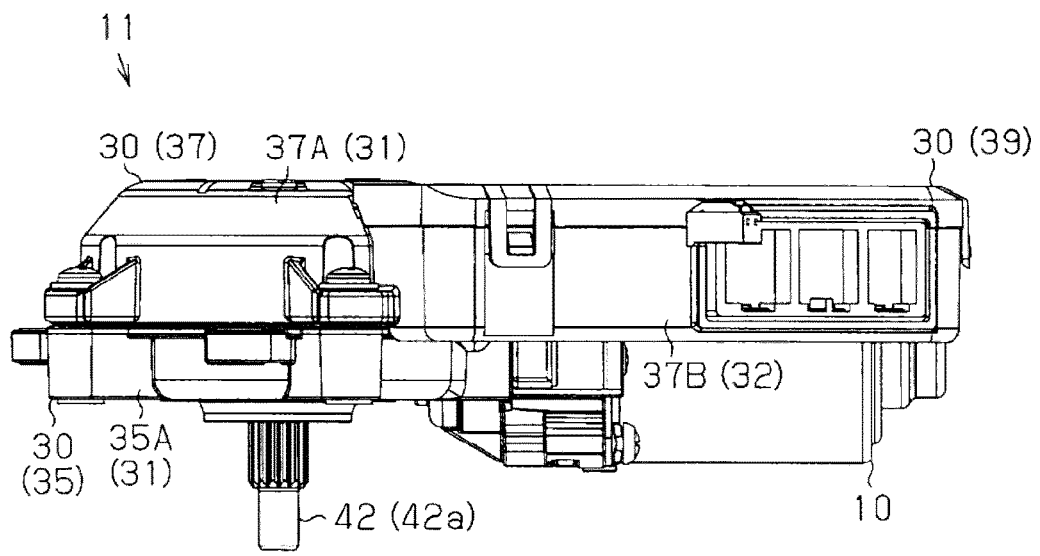
Figure 3:
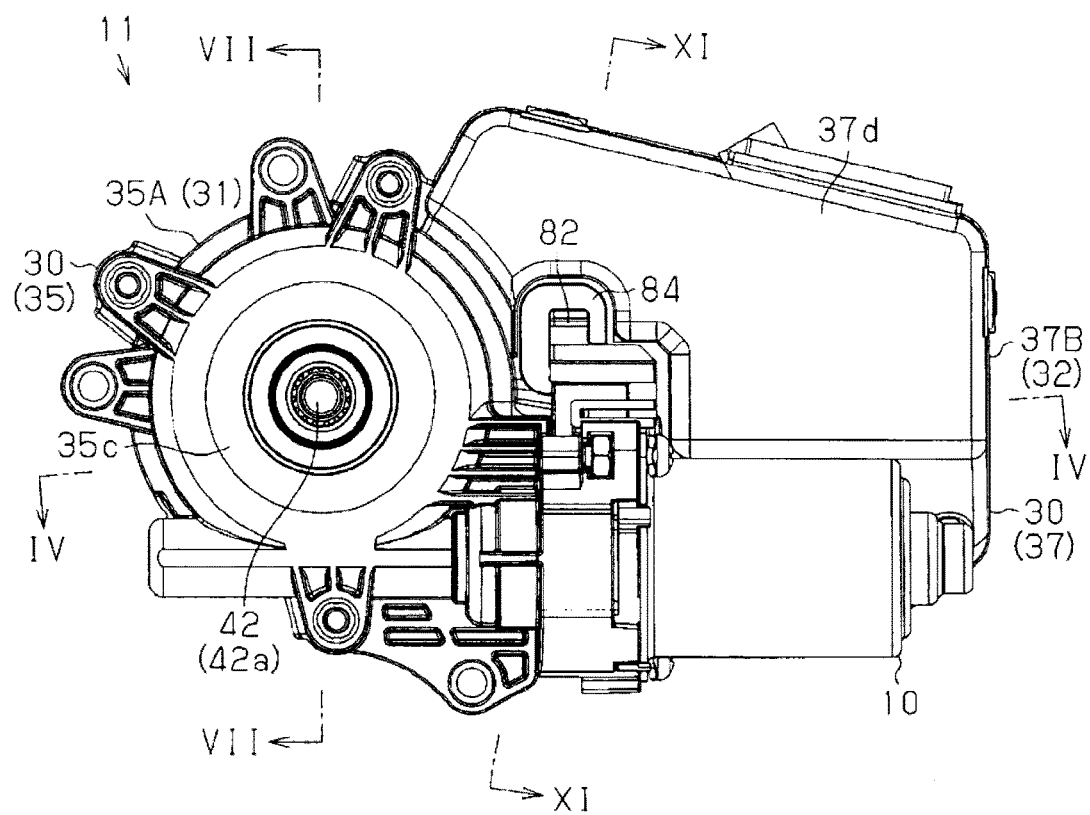
Figure 4:
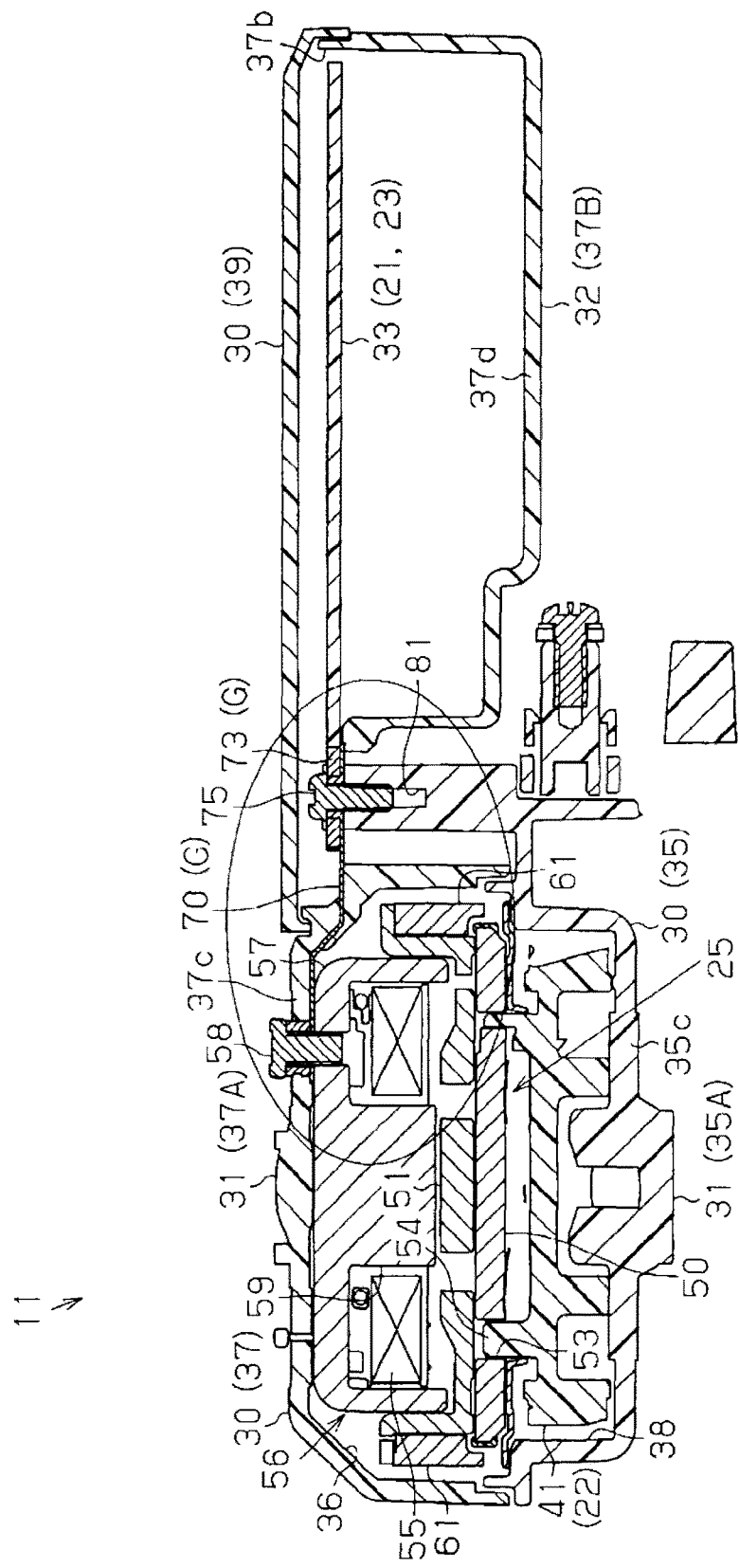

(Actuator apparatus) Next, a configuration of the actuator apparatus of this embodiment will be described. As illustrated in FIGS. 2 to 4, the actuator apparatus 11 of this embodiment is, provided with an accommodation member 30 accommodating the speed reduction mechanism 22 and the electromagnetic clutch 25. Specifically, the accommodation member 30 is provided with a first accommodation portion 31 of which an outer shape is flat substantially-circular cylindrical. The electromagnetic clutch 25 and the speed reduction mechanism 22 are accommodated in the first accommodation portion 31.

In addition, the accommodation member 30 of this embodiment is provided with a second accommodation portion 32 at a lateral side (the right side in each of FIGS. 2 to 4) of the first accommodation portion 31. The second accommodation portion 32 includes an outer shape of a flat substantially-box configuration extending at an outer side in a radial direction of the first accommodation portion 31 formed in the substantially circular cylindrical shape. In this embodiment, an electronic control circuit configuring the control apparatus 21 and the operation position sensor 23 is implemented on a circuit board 33 accommodated in the second accommodation portion 32.

Figure 5:
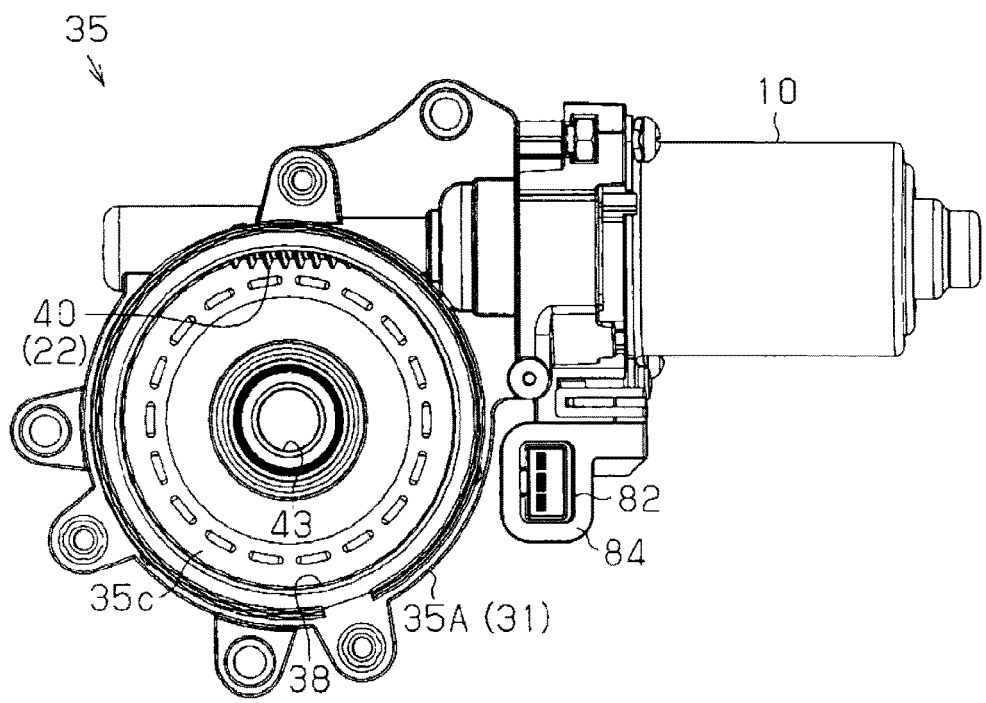
FIG. 5 Side view of a motor housing
Figure 6:
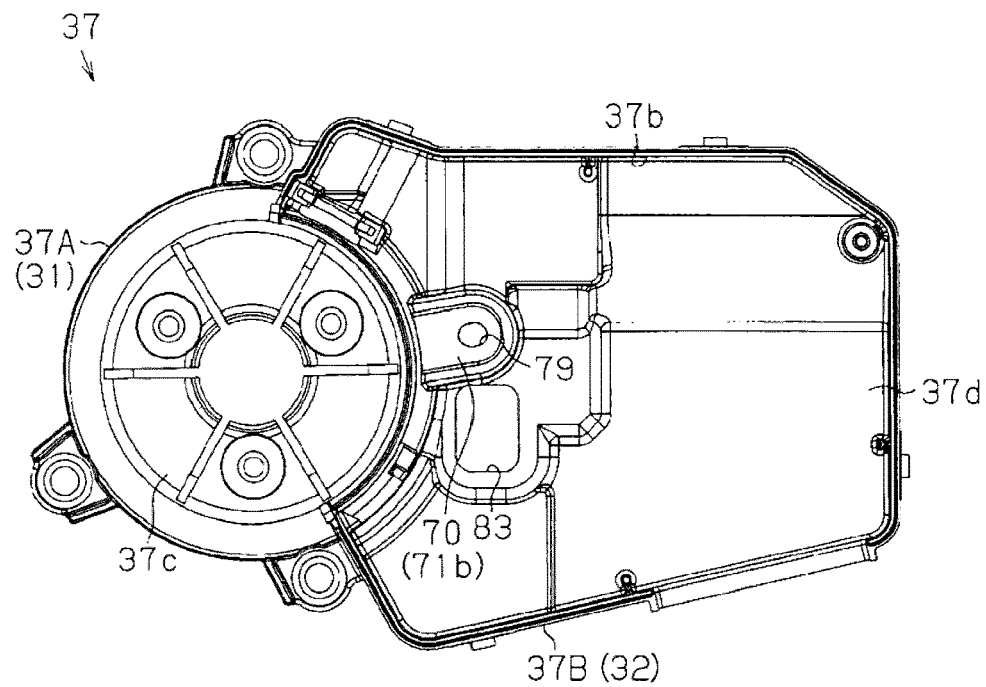
FIG. 6 Side view of a clutch case

As illustrated in FIGS. 4 to 6, the accommodation member 30 of this embodiment is formed by a motor housing 35 and a clutch case 37 which are assembled to each other. The motor housing 35 integrally holds the motor 10 serving as the drive source. The clutch case 37 includes a body portion 37A formed in a substantially circular cylindrical shape with a closed end which constitutes a clutch accommodation chamber 36 at the first accommodation portion 31.

Specifically, as illustrated in FIGS. 4 and 5, the motor housing 35 includes a substantially circular cylindrical shape with a closed end. At the first accommodation portion 31, the motor housing 35 is provided with a body portion 35A constituting a gear accommodation chamber 38. That is, the motor housing 35 and the clutch case 37 are assembled to each other in a manner that the body portion 35A of the motor housing 35 and the body portion 37A of the clutch case 37, each of which opens in an axial direction, face each other. Thus, the first accommodation portion 31 is formed to include the clutch accommodation chamber 36 and the gear accommodation chamber 38 which are in communication with each other in the axial direction.

In addition, as illustrated in FIGS. 4 and 6, at a lateral side relative to the body portion 37A, the clutch case 37 includes a box-shaped portion 37B opening in a direction opposite to a direction in which the body portion 37A opens. In FIG. 4, the body portion 37A opens downwardly and the box-shaped portion 37B opens upwardly. In this embodiment, a cover member 39 closing an opening portion 37*b* is assembled to the box-shaped portion 37B, and thus the second accommodation portion 32 is formed to serve as a circuit board accommodation portion.

More specifically, as illustrated in FIGS. 3 and 5, the motor 10 of this embodiment is held at the motor housing 35 in a manner that a motor shaft that is not shown is inserted inside the gear accommodation chamber 38 from a lateral side of the body portion 35A, and specifically, is held to be substantially parallel with the box-shaped portion 37B of the clutch case 37, more specifically, substantially parallel with a bottom wall portion 37d of the box-shaped portion 37B. A worm gear 40 rotating integrally with the motor shaft is fixed to the motor shaft.

Figure 7:
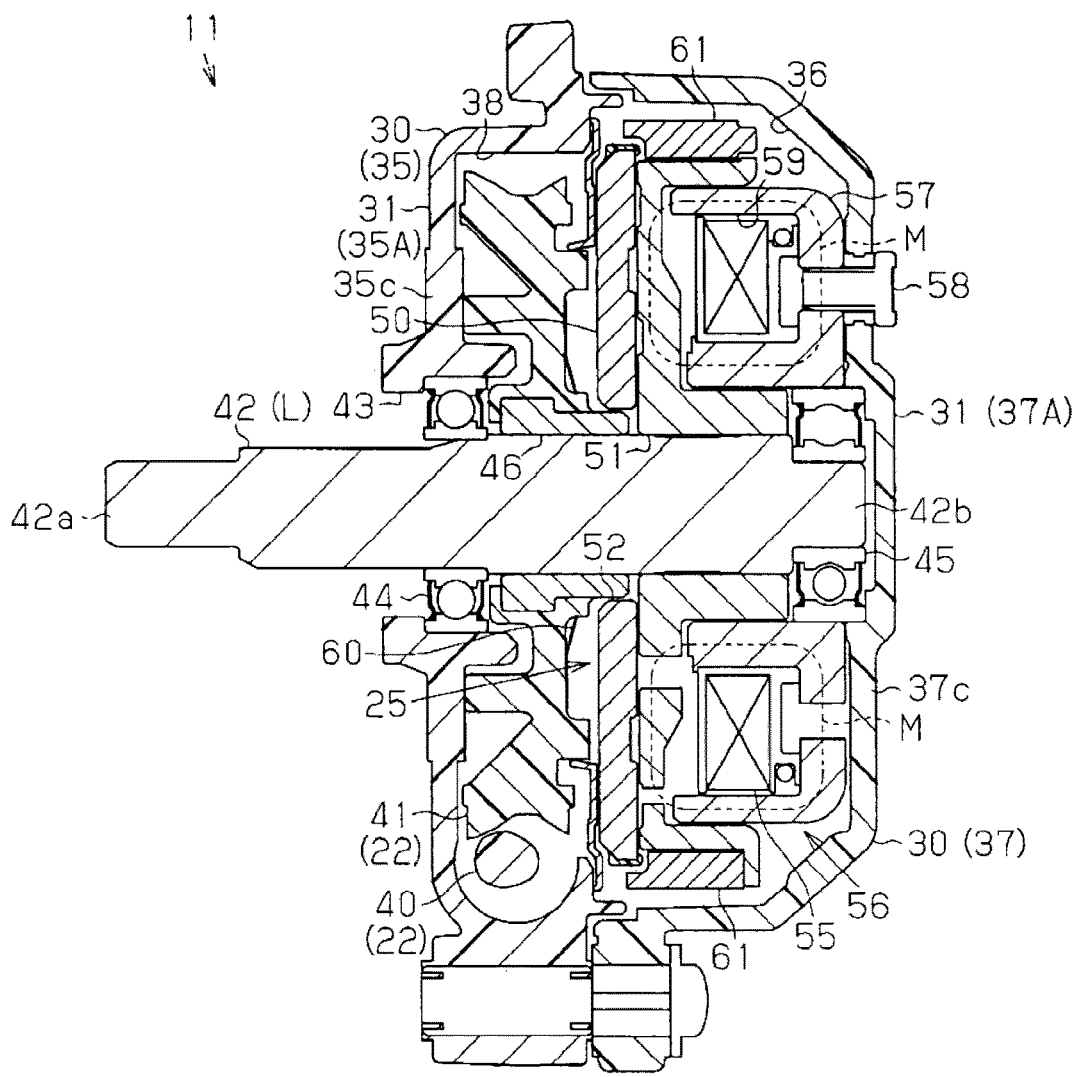
FIG. 7 Cross-sectional view of the actuator apparatus (cross-sectional view taken along line VII-VII of FIG. 3)

That is, as illustrated in FIG. 7, a known worm and wheel is applied to the speed reduction mechanism 22 of this embodiment. A wheel gear 41 meshing with the worm gear 40 is rotatably accommodated inside the gear accommodation chamber 38 of the first accommodation portion 31.

More specifically, an output shaft 42 is provided in the first accommodation portion 31 in a manner that the output shaft 42 is rotatably supported so as to penetrate the body portion 35A of the motor housing 35 in the axial direction (the right and left direction in FIG. 7). The output shaft 42 includes a distal end 42a. Specifically, at a central portion of a bottom wall portion 35c, the body portion 35A of the motor housing 35 includes an opening portion 43 through which the output shaft 42 is inserted. Ball bearings 44 and 45 each rotatably supporting the output shaft 42 are provided inside the opening portion 43 and at a bottom wall portion 37c. The bottom wall portion 37c is around the output shaft 42 at the body portion 37A of the clutch case 37 which opposes the opening portion 43.

The wheel gear 41 is formed by resin. In addition, a sliding bearing 46 including an annular shape is provided at the wheel gear 41 at a central portion serving as a rotation center. The output shaft 42 is inserted into the sliding bearing 46, and thus the wheel gear 41 is rotatably supported in such a manner that an axial end portion of the wheel gear 41 is in sliding contact with (the bottom wall portion 35c of) the body portion 35A of the motor housing 35.

In addition, in this embodiment, an armature 50 and a rotor 51 are accommodated within the first accommodation portion 31. The armature 50 is held by the wheel gear 41 to be movable in the axial direction, and rotates integrally with the wheel gear 41. The rotor 51 is arranged coaxially with the armature 50 in a state where the rotor 51 is rotatable relative to the armature 50, and the rotor 51 rotates integrally with the output shaft 42.

As illustrated in FIGS. 4 and 7, the armature 50 of this embodiment includes an outer shape of a substantially circular plate provided with a circular hole 52 at a central portion. In addition, the armature 50 is formed by a ferrous magnetic material. The output shaft 42 is inserted into the circular hole 52, and thus the armature 50 is arranged coaxially with the wheel gear 41.

In addition, the armature 50 includes plural through holes 53 which are positioned to be arranged in a circumferential direction so as to surround the circular hole 52. Further, plural support protrusions 54 are provided at the wheel gear 41. The plural support protrusions 54 are provided to extend in the axial direction along the output shaft 42 serving as a rotary axis L, thereby being inserted into the respective through holes 53 of the armature 50. The armature 50 is supported by these support protrusions 54, and thus the armature 50 can rotate integrally with the wheel gear 41 serving as a drive member and can move in the axial direction thereof.

The rotor 51 is coaxially fixed to the output shaft 42, and therefore, in a state where the rotor 51 is rotatable integrally with the output shaft 42, the rotor 51 is arranged within the clutch accommodation chamber 36 formed by the body portion 37A of the clutch case 37.

In addition, similarly to the armature 50, the rotor 51 of this embodiment is formed by a ferrous magnetic material.

Further, an electromagnetic coil 55 generating a magnetomotive force when being electrified is provided inside the clutch accommodation chamber 36. In this embodiment, an electromagnet 56, which can make the armature 50 and the rotor 51 to be in pressure contact with each other in accordance with an electromagnetic attractive force generated by the electrification of the electromagnetic coil 55, is formed.

Specifically, a yoke 57 including a substantially annular outer shape and surrounding a base end 42b of the output shaft 42 is provided inside the clutch accommodation chamber 36. In this embodiment, the yoke 57 is fixed to the bottom wall portion 37c of the body portion 37A of the clutch case 37 with the use of a screw member 58. In addition, the yoke 57 is formed by a ferrous magnetic material similarly to the armature 50 and the rotor 51. Further, the yoke 57 includes an annular groove 59 facing a main body of the rotor 51 which is formed in a circular plate shape, and opening in the axial direction (a side of the motor housing 35, the left side in FIG. 7). The electromagnetic coil 55 is held by the yoke 57 in a state where the electromagnetic coil 55 is wound relative to the annular groove 59, which includes a substantially U-shaped cross section, along a circumferential direction thereof.

That is, when being electrified, the electromagnetic coil 55 of this embodiment forms a magnetic circuit M at the yoke 57 and the rotor 51 which are arranged at positions surrounding the electromagnetic coil 55. And accordingly, in this embodiment, the electromagnet 56 formed to include the rotor 51 attracts the armature 50 arranged to be movable in the axial direction, and consequently the armature 50 and the rotor 51 are made to be in pressure contact with each other.

In addition, at the actuator apparatus 11 of this embodiment, the armature 50 rotating integrally with the wheel gear 41 (the drive member) and the rotor 51 rotating integrally with the output shaft 42 (an output member) are configured to be connected to each other so that torque of the motor 10 is transmittable when an opposing surface of the armature 50 and an opposing surface of the rotor 51 which oppose each other are made to be in pressure contact with each other. Accordingly, in this embodiment, the electromagnetic clutch 25 is formed which can switch between a disconnected state in which the armature 50 and the rotor 51 are rotatable relative to each other and a connected state in which the armature 50 and the rotor 51 are connected to each other so that the torque is transmittable, on the basis of an electrification control relative to the electromagnetic coil 55.

That is, a magnetic attractive force of the electromagnet 56 is eliminated by stopping the electrification to the electromagnetic coil 55. Accordingly, when the armature 50 and the rotor 51 are in the disconnected state in which being rotatable relative to each other, the torque transmission path of the motor 10 serving as the drive source can be interrupted.

In this embodiment, a waved washer 60 serving as a biasing member is disposed between the armature 50 and the wheel gear 41 supporting the armature 50. The waved washer 60 includes a known configuration in which concave and convex are formed alternately with each other in a wavy manner along a circumferential direction. The waved washer 60 is disposed between the armature 50 and the wheel gear 41 in a state where the output shaft 42 is inserted into an inside of an annular shape. The armature 50 is biased in the axial direction in accordance with an elastic force of the waved washer 60, and thus the armature 50 is held in a manner of being in sliding contact with the rotor 51.

Figure 8:
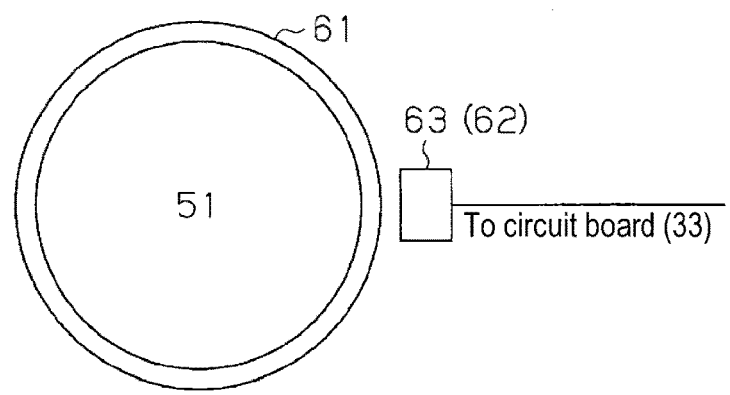
FIG. 8 Explanation diagram schematically illustrating a rotation detector provided in the vicinity of a rotor FIG. 9 Enlarged cross-sectional view of the vicinity of a conductive member (cross-sectional view taken along line IV-IV of FIG. 3)

In addition, as illustrated in FIGS. 7 and 8, a magnet 61 is fixedly attached to an outer circumferential periphery of the rotor 51 in this embodiment. Further, a magnetic detection element 62 is provided inside the accommodation member 30, at a position facing the magnet 61. Specifically, the magnetic detection element 62 is arranged at an outer side of the rotor 51 in a radial direction of the rotor 51, at a position facing the magnet 61. In this embodiment, a rotation detector (a Hall effect IC) 63 is formed which can detect rotation of the rotor 51 on the basis of an output signal of the magnetic detection element 62.

In this embodiment, the operation position sensor 23 (refer to FIG. 1) counts the rotation of the rotor 51 that is detected by the rotation detector 63. Then, the operation position Px of the slide door 1 is detected on the basis of a count value.

Figure 9:
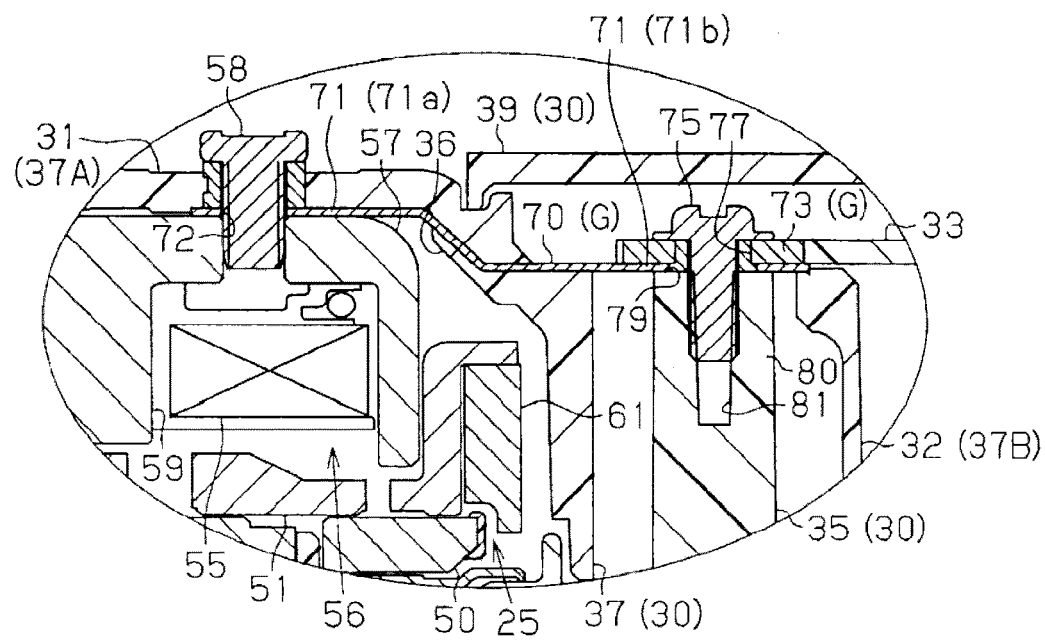

(Electrostatic charge prevention configuration) Next, an electrostatic charge prevention configuration of the actuator apparatus of this embodiment will be described. As illustrated in FIGS. 4 and 9, in this embodiment, each of the motor housing 35 and the clutch case 37 which constitute the accommodation member 30 is formed by the resin. In addition, the actuator apparatus 11 of this embodiment is provided with a conductive member 70 connected to a conductive portion of the electromagnetic clutch 25 accommodated inside the first accommodation portion 31 of the accommodation member 30. The conductive member 70 is configured to form a ground circuit G that can contact the conductive portion of the electromagnetic clutch 25 with the ground.

That is, the wheel gear 41 formed by the resin and the bottom wall portion 35c of the body portion 35A of the motor housing 35 are in sliding contact with each other, and therefore the static electricity is charged at the electromagnetic clutch 25. In light of this aspect, in this embodiment, by forming the ground circuit G and grounding the conductive portion of the electromagnetic clutch 25, the charging of the static electricity which occurs at the electromagnetic clutch 25 is prevented. Accordingly, the configuration reduces a possibility that the static electricity charged at the electromagnetic clutch 25 is discharged to the rotation detector 63 provided at the position facing the rotor 51.

Figure 10:
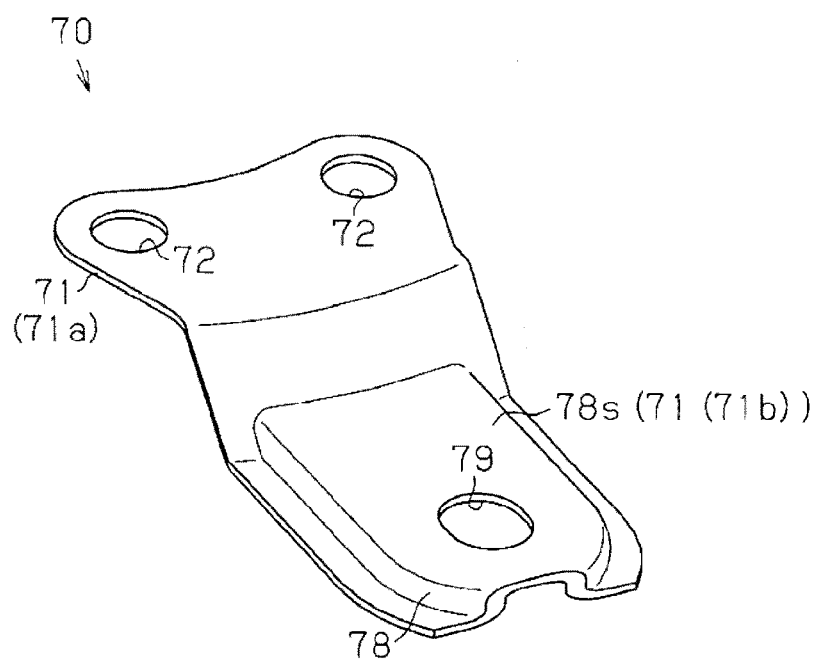
FIG. 10 Perspective view of the conductive member

Specifically, as illustrated in FIG. 10, the conductive member 70 of this embodiment is formed by deformation processing (press working) of plate material made of metal. In addition, as illustrated in FIG. 9, the conductive member 70 is buried in and provided at the clutch case 37 in a state where the conductive member 70 includes an exposed portion 71 (71a, 71b) by insert molding. A first exposed portion 71a exposed to an inside of the clutch accommodation chamber 36 of the first accommodation portion 31 is configured to be connected to the conductive portion of the electromagnetic clutch 25 accommodated in the first accommodation portion 31.

Specifically, the conductive member 70 of this embodiment includes the first exposed portion 71a at a portion at which the yoke 57 of the electromagnetic clutch 25 is fixed to the body portion 37A of the clutch case 37. The first exposed portion 71a is exposed to an inside surface (the lower side in FIG. 9) of the bottom wall portion 37c. The first exposed portion 71a is. The first exposed portion 71a includes an insertion hole 72 through which the screw member 58 for fixing the yoke 57 to the clutch case 37 is inserted.

That is, the conductive member 70 is configured in such a manner that, the yoke 57 is fastened to the bottom wall portion 37c of the clutch case 37, and thus the first exposed portion 71a is sandwiched between the bottom wall portion 37c and the yoke 57. Accordingly, the first exposed portion 71a is in contact with the yoke 57 serving as the conductive portion of the electromagnetic clutch 25, and thus an electrically connected state in which the first exposed portion 71a is electrically connected to the yoke 57 is established.

In addition, as illustrated in FIGS. 4 and 9, the conductive member 70 of this embodiment includes a second exposed portion 71b exposed to an inside of the second accommodation portion 32 accommodating the circuit board 33. That is, the conductive member 70 is provided at the clutch case 37 in the buried manner so as to straddle the body portion 37A constituting the first accommodation portion 31 and the box-shaped portion 37B constituting the second accommodation portion 32. In addition, the circuit board 33 of this embodiment includes a grounding conductive portion 73 electrically connected relative to a body ground (GND). Further, the circuit board 33 is fixed within the second accommodation portion 32, and thus it is configured that the grounding conductive portion 73 is connected to the second exposed portion 71b of the conductive member 70. Accordingly, in this embodiment, the ground circuit G is formed, and the ground circuit G can ground the conductive portion (the yoke 57) of the electromagnetic clutch 25 which is connected to the first exposed portion 71a of the conductive member 70.

More specifically, in this embodiment, the conductive member 70 is integrally provided at the clutch case 37 as described above. Accordingly, the clutch case 37 constituting the first accommodating member is fastened to the motor housing 35 serving as the second accommodation member with the use of a screw member 75. The conductive member 70 is configured in such a manner that the second exposed portion 71b is arranged at a portion of the conductive member 70 which is fixed to the motor housing 35.

Specifically, at the clutch case 37 of this embodiment, a portion fixed to the motor housing 35 is set at the bottom wall portion 37d of the box-shaped portion 37B that is substantially parallel with the motor 10 as described above. In addition, the conductive member 70 is configured in such a manner that the second exposed portion 71b is exposed to an inside surface (the upper side in each of FIGS. 4 and 9) of the portion fixed to the motor housing 35. Further, the circuit board 33 of this embodiment includes an insertion hole 77 through which the screw member 75 is inserted. The grounding conductive portion 73 is provided at a peripheral edge of the insertion hole 77.

Figure 11:
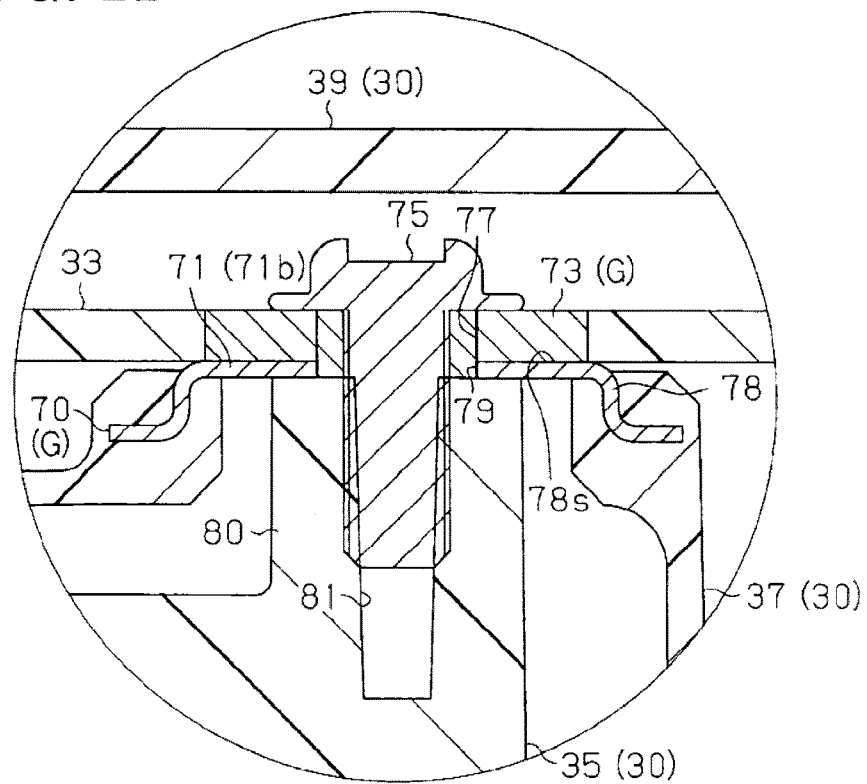
FIG. 11 Enlarged cross-sectional view of the vicinity of a grounding conductive portion provided at a circuit board (cross-sectional view taken along line XI-XI of FIG. 3)

Here, as illustrated in FIGS. 10 and 11, the conductive member 70 of this embodiment is provided with an expanded shape portion 78 including, at a top portion thereof, a flat surface 78s serving as the second exposed portion 71b. In addition, the second exposed portion 71b includes an insertion hole 79 through which the screw member 75 is inserted. The screw member 75 is inserted through each of the insertion holes 77 and 79 formed at the circuit board 33 and the second exposed portion 71b, and thus the screw member 75 is screwed and attached to a screw hole 81 formed at a fixing portion 80 of the motor housing 35.

That is, in this embodiment, the circuit board 33 is fastened together with the clutch case 37 and the motor housing 35 on the basis of a fastening force of the screw member 75. In consequence, the second exposed portion 71b is in contact with the grounding conductive portion 73, and accordingly the conductive member 70 of this embodiment is adapted to establish the electrically connected state of the conductive member 70 and the grounding conductive portion 73.

Figure 12:
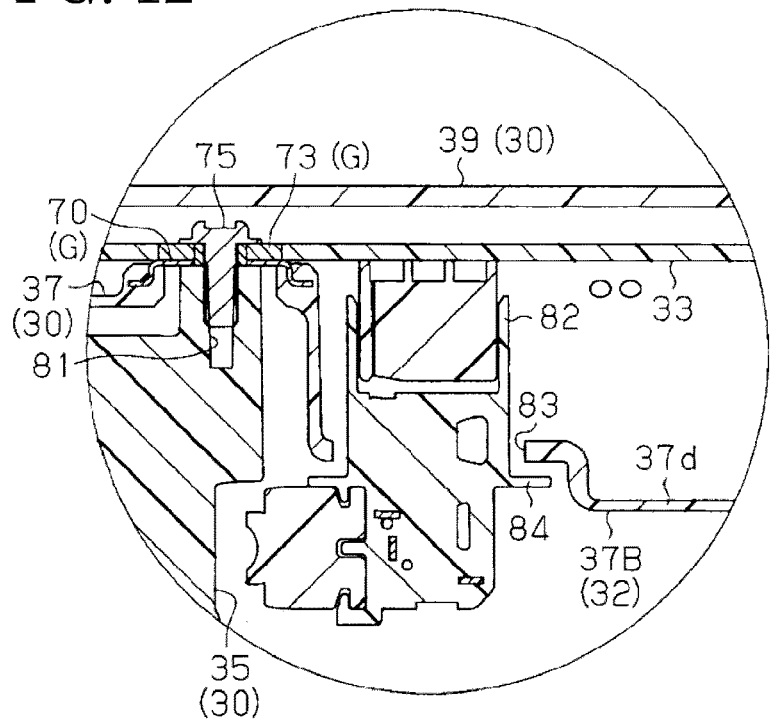
FIG. 12 Enlarged cross-sectional view of the vicinity of a power supply connector (cross-sectional view taken along line XI-XI of FIG. 3)

In addition, as illustrated in FIGS. 5, 6 and 12, in this embodiment, at the bottom wall portion 37d of the box-shaped portion 37B constituting a wall portion of the second accommodation portion 32 serving the circuit board accommodation portion, a through hole 83 into which a power supply connector 82 of the motor 10 is inserted is formed by the clutch case 37 and the motor housing 35 being assembled. Accordingly, in this embodiment, the motor 10 and the circuit board 33 on which the control apparatus 21 and the operation position sensor 23 (refer to FIG. 1) are implemented are electrically connected to each other.

Here, in this embodiment, a flange 84 is formed at an outer circumferential periphery of the power supply connector 82 having an outer shape of a substantially rectangular columnar shape. The flange 84 opposes the bottom wall portion 37d of the box-shaped portion 37B at a peripheral edge of the through hole 83 into which the power supply connector 82 is inserted. Specifically, the flange 84 is provided over the entire circumference of the power supply connector 82 to extend outwardly in a radial direction. In this embodiment, the flange 84 forms a labyrinthine structure, thereby preventing a foreign material from entering via the through hole 83.

Next, an operation of the electrostatic charge prevention configuration that is configured as described above will be described. The first exposed portion 71a of the conductive member 70 integrally provided at the clutch case 37 is connected to the conductive portion (the yoke 57) of the electromagnetic clutch 25 and the second exposed portion 71b of the conductive member 70 integrally provided at the clutch case 37 is connected to the grounding conductive portion 73 of the circuit board 33. Accordingly, the ground circuit G that can contact the conductive portion of the electromagnetic clutch 25 with the ground is formed. Consequently, the charging of the static electricity occurring at the electromagnetic clutch 25 is adapted to be prevented.

According to this embodiment as described above, the following effects can be obtained. (1) The actuator apparatus 11 is provided with the motor 10, the electromagnetic clutch 25 that can selectively connect and disconnect the transmission path of the motor torque, and the accommodation member 30 accommodating the electromagnetic clutch 25. The wheel gear 41 serving as the drive member and supporting the armature 50 of the electromagnetic clutch 25 is rotatably supported in a state where the wheel gear 41 is in sliding contact with the accommodation member 30. The actuator apparatus 11 is provided integrally with the accommodation member 30 and is connected to the conductive portion of the electromagnetic clutch 25, thereby including the conductive member 70 forming the ground circuit G that can contact the conductive portion with the ground.

According to the above-described configuration, the electromagnetic clutch 25 can be prevented from being charged with the static electricity. As a result, the possibility that the charged static electricity is discharged to an electronic component arranged in the vicinity of the electromagnetic clutch 25 can be reduced. By providing the conductive member 70 integrally with the accommodation member 30, complication of an assembling work thereof can be avoided.

(2) The actuator apparatus 11 is provided with the circuit board 33. The circuit board 33 includes the grounding conductive portion 73 and is accommodated within the accommodation member 30 and fixed to the accommodation member 30, and thus the circuit board 33 is configured in a manner that the grounding conductive portion 73 is connected to the conductive member 70.

According to the above-described configuration, the ground circuit G using the conductive member 70 can be formed easily. (3) The accommodation member 30 is formed by including the clutch case 37 to which the conductive member 70 is integrally provided and the motor housing 35 fixed to the clutch case 37 by being fastened with the use of the screw member 75. In addition, the circuit board 33 includes the insertion hole 77 through which the screw member 75 is inserted and the circuit board 33 is fastened together with the clutch case 37 and the motor housing 35. The grounding conductive portion 73 is provided at the peripheral edge of the insertion hole 77.

According to the above-described configuration, by the fastening using the screw member 75, the fixation of the circuit board 33 can be performed in conjunction with the fixation of the motor housing 35 and the clutch case 37. In addition, the conductive member 70 can be made in contact with the grounding conductive portion 73 easily and reliably. Accordingly, the electrically connected state of the conductive member 70 and the grounding conductive portion 73 with each other can be established. As a result, a working efficiency thereof can be enhanced.

(4) The conductive member 70 is formed with the insertion hole 79 through which the screw member 75 is inserted. Thus, the conductive member 70 is fastened together with the circuit board 33, the motor housing 35 and the clutch case 37. As a result, a more reliably held and connected state can be assured.

(5) The conductive member 70 is provided at the clutch case 37 in the buried manner by the insert molding in a state where the conductive member 70 includes the exposed portion 71 (71a, 71b). According to the above-described configuration, the conductive member 70 can be held by the clutch case 37 easily and reliably. In addition, positioning at a time of the assembling can be conducted easily because integrity of the conductive member 70 and the clutch case 37 with each other is high. As a result, the working efficiency can be enhanced.

(6) The conductive member 70 is provided with the expanded shape portion 78 including, at the top portion thereof, the flat surface 78s serving as the exposed portion 71 (71b). According to the above-described configuration, the conductive member 70 can be held by the clutch case 37 in a state where more part of the conductive member 70 is buried. As a result, the conductive member 70 can be prevented from coming off, which attributes to, for example, vibrations. In addition, by utilizing the flat surface 78s serving as the exposed portion 71, the more reliable connected state can be assured.

(7) The actuator apparatus 11 is provided with the rotation detector 63 provided at the position facing the rotor 51 of the electromagnetic clutch 25. In such a configuration, the static electricity charged at the electromagnetic clutch 25 may possibly be discharged from the rotor 51 to the rotation detector 63. Therefore, by applying the electrostatic charge prevention configurations of the aforementioned (1) to (6) to such a configuration, more significant effects can be obtained.

(8) The motor 10 is fixed to the motor housing 35, and the second accommodation portion 32 serving as the circuit board accommodation portion accommodating the circuit board 33 is formed at the clutch case 37. In addition, at the bottom wall portion 37d of the box-shaped portion 37B constituting the wall portion of the second accommodation portion 32, by assembling the clutch case 37 and the motor housing 35, the through hole 83 into which the power supply connector 82 of the motor 10 is inserted is formed. At the power supply connector 82, the flange 84 is formed at the bottom wall portion 37d of box-shaped portion 37B at the outer periphery of the through hole 83.

According to the above-described configuration, the flange 84 forms the labyrinthine structure, thereby preventing the foreign material from entering via the through hole 83. The aforementioned embodiment may be changed as follows.

In the aforementioned embodiment, by being in contact with the yoke 57 of the electromagnetic clutch 25, the first exposed portion 71a of the conductive member 70 forms the ground circuit G that can make the yoke 57 to be in contact with the ground. However, the conductive portion of the electromagnetic clutch 25 to which the conductive member 70 is connected is not limited thereto, and may be changed arbitrarily. For example, it may be configured in a manner that the conductive member 70 and the conductive portion of the electromagnetic clutch 25 are connected indirectly with each other via other member having conductivity, including, the ball bearing 45.

In the aforementioned embodiment, the ground circuit G is formed, in which one end (the second exposed portion 71b) of the conductive member 70 is connected to the grounding conductive portion 73 of the circuit board 33, and consequently the conductive portion (the yoke 57) of the electromagnetic clutch 25 which is connected to the other end (the first exposed portion 71a) of the conductive member 70 is in contact with the ground. However, the ground circuit G is not limited thereto and it may be configured in a manner that the conductive member 70 is connected to a grounding conductive portion other than the circuit board 33 so that the ground circuit G is formed.

In the aforementioned embodiment, the circuit board 33 is fastened together with the motor housing 35 and the clutch case 37 by the fastening using the screw member 75, and thus the circuit board 33 is fixed inside the second accommodation portion 32. Accordingly, the grounding conductive portion 73 is connected to the second exposed portion 71b of the conductive member 70. However, as long as the electrically connected state of the grounding conductive portion 73 and the conductive member 70 to each other can be established due to the fixation relative to the accommodation member 30, the method of fixing is not limited thereto and may be arbitrarily changed to, for example, use an engaging and fixing structure including a so-called snap-fit.

In the aforementioned embodiment, the conductive member 70 is integrally provided at the clutch case 37, and thus the clutch case 37 constitutes the first accommodation member and the motor housing 35 fixed to the clutch case 37 constitutes the second accommodation member. However, by providing the conductive member 70 at the motor housing 35, the motor housing 35 may constitute the first accommodation member and the clutch case 37 may constitute the second accommodation member.

Further, the number, and shapes and configurations of the members constituting the accommodation member 30 may be arbitrarily changed. In addition, it may be arbitrarily set which of the members constituting the accommodation member 30 should serve as the first accommodation member.

In the aforementioned embodiment, the conductive member 70 is provided at the clutch case 37 in the buried manner by the insert molding in a state where the exposed portion 71 (71a, 71b) is included. However, the conductive member 70 may be configured to be integrally provided at the accommodation member 30 by an arbitrary fixing unit including, for example, engagement, adhesion or fastening.

In addition, in the aforementioned embodiment, the conductive member 70 is formed by the deformation processing (press working) of the plate material made of metal. However, the conductive member 70 is not limited thereto and may be formed by other material, including, for example, wire rod and/or conductive film.

In the aforementioned embodiment, the conductive member 70 is provided with the expanded shape portion 78 including, at the top portion thereof, the flat surface 78s serving as the second exposed portion 71b. However, the conductive member 70 is not limited thereto and an expanded shape portion that is similar to the expanded shape portion 78 may be formed also at the first exposed portion 71a. The aforementioned embodiment may be modified also to a configuration which does not include such an expanded shape portion 78.

In the aforementioned embodiment, the rotation detector 63 is provided at the position facing the rotor 51 of the electromagnetic clutch 25. However, an electrostatic charge prevention configuration similar to the above-described embodiment may be applied in a case where an electric component, to which the static electricity charged at the electromagnetic clutch 25 may possibly be discharged, is provided in the vicinity of the electromagnetic clutch 25, even though such a rotation detector 63 is not provided.

Figure 13:
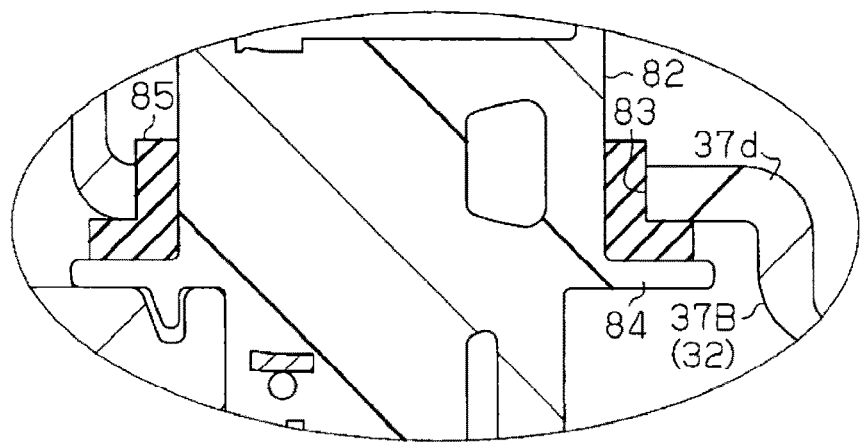
FIG. 13 Enlarged cross-sectional view illustrating a seal member provided at the power supply connector (cross-sectional view taken along line XI-XI of FIG. 3)

In the aforementioned embodiment, the flange 84 provided at the power supply connector 82 forms the labyrinthine structure, thereby preventing the foreign material from entering via the through hole 83 into which the power supply connector 82 is inserted, however, the structure is not limited thereto. A configuration may be applied in which a seal member 85 capable of sealing between the through hole 83 and the power supply connector 82 is provided at a clearance between the through hole 83 and the power supply connector 82 as illustrated in FIG. 13. Accordingly, a high water proofing property can be assured. In addition, the flange 84 holds the seal member 85, and thereby preventing the seal member 85 from coming off and missing.

In the aforementioned embodiment, the electronic control circuit constituting the control apparatus 21 controlling the operation of the actuator apparatus 11 and the operation position sensor 23 detecting the operation position Px of the slide door 1 is implemented on the circuit board 33. However, a configuration of the electronic circuit implemented on the circuit board 33, and a size and a shape of the circuit board 33 and the second accommodation portion 32 serving as the circuit board accommodation portion can be any configuration, and any size and shape.

Figure 14:
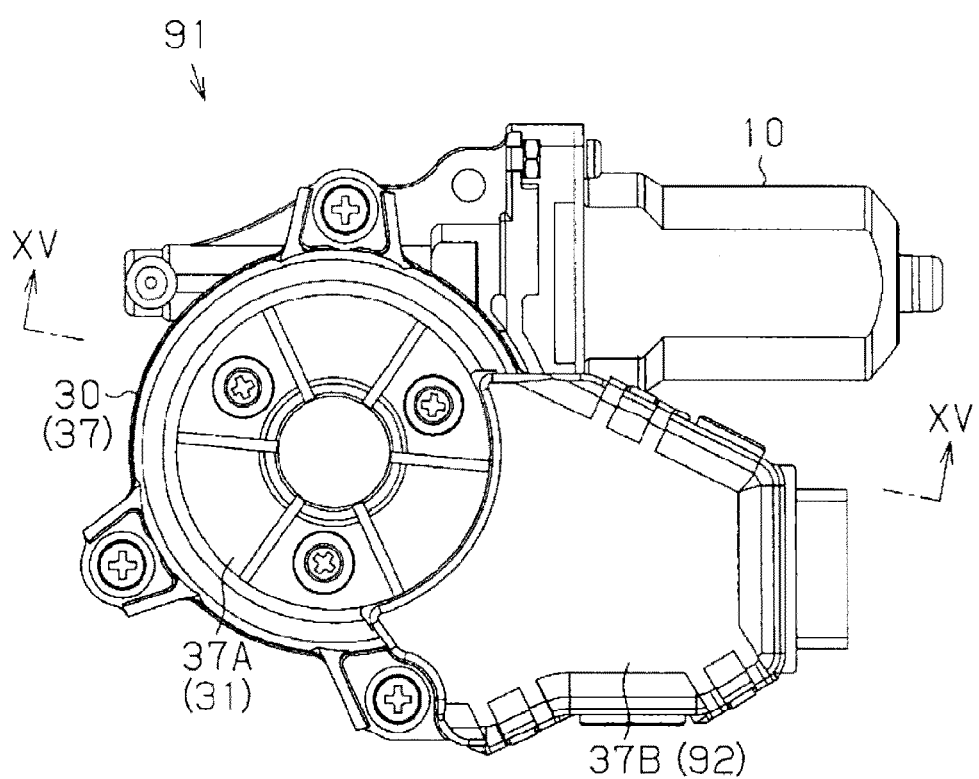
FIG. 14 Side view of an actuator apparatus of another embodiment
Figure 15:
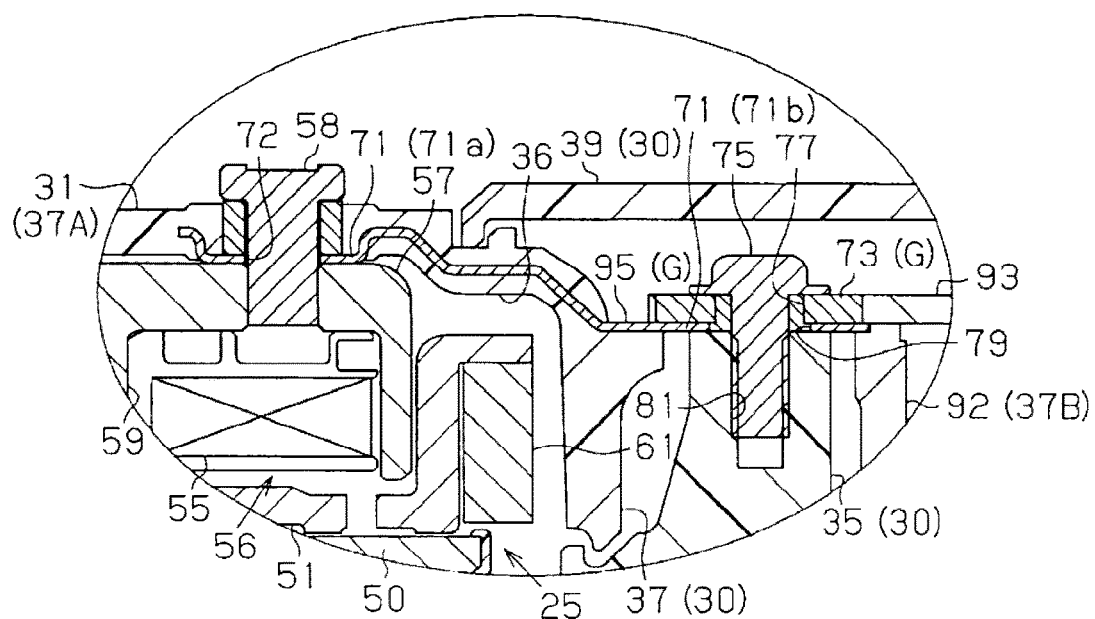
FIG. 15 Enlarged cross-sectional view of the vicinity of a conductive member of the actuator apparatus of another embodiment (cross-sectional view taken along line XV-XV of FIG. 14)
Figure 16:
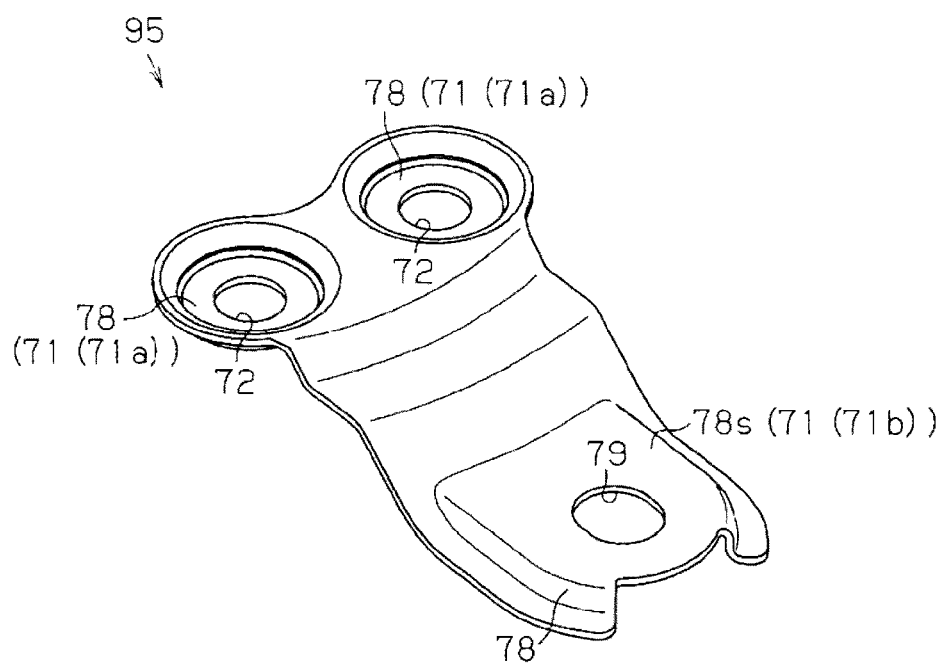
FIG. 16 Perspective view of the conductive member of another embodiment

For example, an electrostatic charge prevention configuration similar to the above-described embodiment may be applied to an electric actuator apparatus 91 illustrated in FIGS. 14 and 15, at which a second accommodation portion 92 and a circuit board 93 accommodated within the second accommodation portion 92 are relatively small. As illustrated in FIG. 16, the expanded shape portion 78 that is similar to the conductive member 70 of the aforementioned embodiment may be provided at a conductive member 95. As illustrated in FIGS. 15 and 16, at the conductive member 95, also a peripheral edge portion of the insertion hole 72 through which the screw member 58 is inserted is the expanded shape portion 78. Accordingly, the conductive member 95 can be held more reliably.

In the aforementioned embodiment, the armature 50 is made to be in contact with the rotor 51 by using the waved washer 60 as the biasing member, however, the biasing member may be changed arbitrarily. In addition, a configuration that does not include such a biasing member can be applied.

In the aforementioned embodiment, the wheel gear 41 is rotatably supported in a state where the axial end portion of the wheel gear 41 is in sliding contact with the bottom wall portion 35c of the body portion 35A of the motor housing 35. However, not limited thereto, the aforementioned electrostatic charge prevention effect can be applied if there is a possibility that the static electricity is charged at the electromagnetic clutch 25 due to the sliding contact, even though the sliding contact is not continuous.

In addition, in the aforementioned embodiment, a case where the wheel gear 41 forming the speed reduction mechanism 22 constitutes the drive member is exemplified. However, the drive member is not limited thereto and may be arbitrarily changed. Whatever the drive member is, the electrostatic charge prevention effect similar to the aforementioned embodiment can be applied if there is a possibility that the static electricity is generated at the electromagnetic clutch 25 due to the sliding contact with the accommodation member 30.

In the aforementioned embodiment, the actuator apparatus 11 is applied to the power slide door apparatus 20, however, may be applied to an actuator apparatus that is used for other purpose than this. For example, the actuator apparatus 11 may be applied to other opening and closing body drive apparatus for a vehicle, which causes an opening and closing body other than the slide door 1 to perform the opening and closing operation. The opening and closing body other than the slide door 1 includes, for example, a backdoor, a luggage door or a trunk lid which are provided at a rear portion of the vehicle.

The invention claimed is:

1. An actuator apparatus comprising:
   a motor functioning as a drive source;
   an electromagnetic clutch being capable of selectively connecting and disconnecting a torque transmission path of the motor; and
   an accommodation member accommodating the electromagnetic clutch, the electromagnetic clutch including:
   an armature supported by a drive member rotated by motor drive, the armature being adapted to rotate integrally with the drive member and to be movable in an axial direction;
   a rotor arranged coaxially with the armature to be rotatable relative to the armature, the rotor being adapted to rotate integral with an output member; and
   an electromagnet causing the armature and the rotor to be in pressure contact with each other in accordance with an electromagnetic attractive force generated by electrification and being capable of connecting the armature and the rotor to each other in such a manner that torque of the motor is transmittable, and the actuator apparatus comprising:
   a conductive member integrally provided at the accommodation member and being connected to a conductive portion of the electromagnetic clutch in such a manner that the conductive member forms a ground circuit that can connect the conductive portion with ground.

2. The actuator apparatus according to claim 1, further comprising:
   a circuit board including a grounding conductive portion and accommodated in the accommodation member, the circuit board being fixed to the accommodation member in such a manner that the grounding conducting portion is connected to the conductive member.

3. The actuator apparatus according to claim 2, wherein the accommodation member includes a first accommodation member at which the conductive member is integrally provided and a second accommodation member fixed to the first accommodation member by being fastened with the use of a screw member,
   the circuit board includes an insertion hole through which the screw member is inserted, the circuit board is fastened together with the first and second accommodation members, and
   the grounding conductive portion is provided at a peripheral edge of the insertion hole.

4. The actuator apparatus according to claim 3, wherein the conductive member includes an insertion hole through which the screw member is inserted.

5. The actuator apparatus according to claim 1, wherein the conductive member is buried in and provided at the accommodation member by insert molding in a state where the conductive member includes an exposed portion.

6. The actuator apparatus according to claim 5, wherein the conductive member is provided with an expanded shape portion including a flat surface at a top portion thereof, and the flat surface corresponds to the exposed portion.

7. The actuator apparatus according to claim 1, further comprising:
   a rotation detector provided at a position facing the rotor.

8. The actuator apparatus according to claim 1, further comprising:
   a housing to which the motor is fixed; and
   a case including a circuit board accommodation portion, wherein
   a wall portion of the circuit board accommodation portion includes a through hole into which a power supply connector of the motor is inserted by assembling the housing and the case, and
   the power supply connector includes a flange facing the wall portion at a peripheral edge of the through hole.

9. The actuator apparatus according to claim 8, further comprising:
   a seal member provided at the flange to be capable of sealing a clearance between the through hole and the power supply connector inserted in the through hole.

10. A control apparatus for an opening and closing body for a vehicle comprising:
    an actuator apparatus including:
    a motor functioning as a drive source;
    an electromagnetic clutch being capable of selectively connecting and disconnecting a torque transmission path of the motor; and
    an accommodation member accommodating the electromagnetic clutch, the electromagnetic clutch including:
    an armature supported by a drive member rotated by motor drive, the armature being adapted to rotate integrally with the drive member and to be movable in an axial direction;
    a rotor arranged coaxially with the armature to be rotatable relative to the armature, the rotor being adapted to rotate integral with an output member; and
    an electromagnet causing the armature and the rotor to be in pressure contact with each other in accordance with an electromagnetic attractive force generated by electrification and being capable of connecting the armature and the rotor to each other in such a manner that torque of the motor is transmittable, and the actuator apparatus including:
    a conductive member integrally provided at the accommodation member and being connected to a conductive portion of the electromagnetic clutch in such a manner that the conductive member forms a ground circuit that can connect the conductive portion with ground.

\* \* \* \* \*